(12) United States Patent
Gailloux et al.

(10) Patent No.: US 10,516,754 B1
(45) Date of Patent: Dec. 24, 2019

(54) SYSTEMS AND METHODS FOR IDENTITY CONFIRMATION AND RAPID RESPONSE TO THIRD PARTY IDENTITY QUERIES

(71) Applicant: Sprint Communications Company L.P., Overland Park, KS (US)

(72) Inventors: Michael A. Gailloux, Overland Park, KS (US); Lauren R. King, Somerset, NJ (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 276 days.

(21) Appl. No.: 15/401,925

(22) Filed: Jan. 9, 2017

(51) Int. Cl.
*H04L 29/08* (2006.01)
*H04W 88/02* (2009.01)
*H04W 84/04* (2009.01)
*H04L 29/06* (2006.01)

(52) U.S. Cl.
CPC .......... *H04L 67/306* (2013.01); *H04L 67/20* (2013.01); *H04L 67/26* (2013.01); *H04L 67/42* (2013.01); *H04W 84/042* (2013.01); *H04W 88/02* (2013.01)

(58) Field of Classification Search
CPC ........ H04L 67/306; H04L 67/20; H04L 67/26
USPC ....................................................... 709/223
See application file for complete search history.

(56) References Cited

U.S. PATENT DOCUMENTS

| | | | | |
|---|---|---|---|---|
| 8,224,753 B2* | 7/2012 | Atef | ........................ | G06F 21/31 340/5.8 |
| 8,239,325 B2* | 8/2012 | Schwarz | ................ | G06Q 20/14 705/35 |
| 9,319,391 B2* | 4/2016 | Wentworth | ............. | G06F 21/31 |
| 9,391,986 B2* | 7/2016 | Schultz | ................. | H04L 9/3231 |
| 2006/0218407 A1* | 9/2006 | Toms | .................... | G06Q 20/341 713/182 |
| 2011/0035240 A1* | 2/2011 | Joao | ........................ | G06Q 20/10 705/4 |
| 2015/0006479 A1* | 1/2015 | Hsu | ......................... | G06F 16/27 707/610 |

* cited by examiner

*Primary Examiner* — Esther B. Henderson
*Assistant Examiner* — Nazia Naoreen

(57) ABSTRACT

Identity confirmation is sought by vendors in order to confirm the identity of, for example, parties attempting to open accounts and/or make purchases. Various vendors, including utility companies, financial institutions, and retailers, may submit identity queries to a telecommunications service provider. The provider may or may not be able to confirm the identities submitted in these queries, and may store the received queries and employ a plurality of sensors in order to eventually determine if there is enough corresponding and/or overlapping information received to confirm identities or promote previously unconfirmed identities to a verified identity data store.

20 Claims, 7 Drawing Sheets

SYSTEMS AND METHODS FOR IDENTITY CONFIRMATION AND RAPID RESPONSE TO THIRD PARTY IDENTITY QUERIES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers maintain numerous accounts for users that may be associated one or more devices, phone numbers, and service plans. These users may additionally have interactions with parties including financial institutions, travel-based companies, retailers, and other providers of goods and services. These parties may endeavor to confirm the identity of the user for a variety of reasons, and may seek to confirm the identity of the user based on a user's association with a telecommunications service provider. Telecommunications service providers may receive thousands of queries from parties who seek to confirm the users' identities based on the telecommunications service provider's interactions with and records of the users.

SUMMARY

In an embodiment, a system for verifying identities, comprising: a plurality of user equipment (UE) associated with a plurality of identities; a first plurality of sensors in communication with each UE of the plurality of UE; a server associated with a telecommunications service provider; a second plurality of sensors configured to capture a query transmitted to the telecommunications service provider server from a plurality of querying servers, wherein each querying server of the plurality of querying servers is associated with a third party. In an embodiment, the system further comprises: an application stored in a non-transitory memory of the telecommunications service provider server and executable by a processor to: receive a plurality of information from the first and the second pluralities of sensors; store the received plurality of information in a supplemental data store; perform, in response to at least one of a time-based trigger or a trigger associated with a predetermined number of queries received for an identity of the plurality of identities, an analysis to determine if one or more thresholds are met; transmit, based on a determination that a first threshold associated with a number of queries associated with the identity is met for the identity, a request to a remote server for identity confirmation of the identity, receive a response from the remote server. In an embodiment, the application is further configured to, based on at least one of the response received from the remote server or the analysis performed, at least one of: promote the identity to a different data store, wherein the different data store comprises identities associated with confirmed identities, flag the identity for further analysis; revoke the identity; or assign or adjust a confidence level associated with the identity and store the confidence level in the supplemental data store.

In an embodiment, a system for evaluating and responding to identity queries, comprising: a plurality of user equipment (UE) associated with a telecommunications service provider; a server associated with the telecommunications service provider and in communication with the plurality of querying servers via a network, the server comprising an application stored in a non-transitory memory and executable by a processor to: receive a plurality of queries for identity confirmation from a plurality of querying servers, wherein each querying server of the plurality of querying servers is associated with a third party; determine if a first piece of information contained in a query of the plurality of queries received is in a confirmed identity data store; and return, to the querying server, a confirmation notification comprising a confidence level associated with identity confirmation based on a determination that the first piece of information is in the confirmed identity data store, wherein the confirmed identity data store comprises a plurality of identities associated with confirmed identities. In an embodiment, the system is further configured to determine, in response to a determination that the first piece of information is not located in the confirmed identity data store, if the first piece of query information is in a supplemental data store, and at least one of: return, based on a determination that the first piece of information is not in the supplemental data store, a data missing notification to the querying server comprising an indication that the first piece of information was not found in the first or the supplemental data stores and the identity is not confirmed, return, based on the determination that the query information is in the supplemental data store and consistent with the information in the supplemental data store, a supplemental data store notification to the querying server, or promote, based on a determination that the information in the supplemental data store associated with the first piece of information meets or exceeds a predetermined threshold, an identity associated with the first piece of information from the supplemental data store to the confirmed identity data store and return a promotion notification to the querying server, and store the query in the supplemental data store.

In an embodiment, a method of confirming identities for third parties, comprising: receiving, by an application stored in a non-transitory memory of a telecommunication service provider's server and executable by a processor, a plurality of queries for identity confirmation from a querying server of the plurality of querying servers; determining, by the application, if a first piece of information contained in a query of the plurality of queries is in a confirmed identity data store; and returning, by the application, to the querying server, a confirmation notification comprising a confidence level associated with identity confirmation based on a determination that the first piece of information is in the confirmed identity data store, wherein the confirmed identity data store comprises a plurality of confirmed identities. In an embodiment, the method further comprises determining, by the application, in response to a determination that the first piece of information is not located in the confirmed identity data store, if the first piece of query information is in a supplemental data store, and at least one of: returning, by the application, based on a determination that the first piece of information is not in the supplemental data store, a supplemental data store notification to the querying server comprising an indication that the first piece of information was not found in the first or the supplemental data stores and the identity is not confirmed, returning, based on the determination that the query information is in the supplemental data store and consistent with the information in the supplemental data store, a supplemental data store notification to the querying server, or promoting, based on a determination that the information in the supplemental data store associated with the first piece of information meets or exceeds a predetermined threshold of queries comprising related information received over a time period, an identity associated with the first piece of information from the supplemental data store to the confirmed identity data store and return a promotion notification to the querying server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
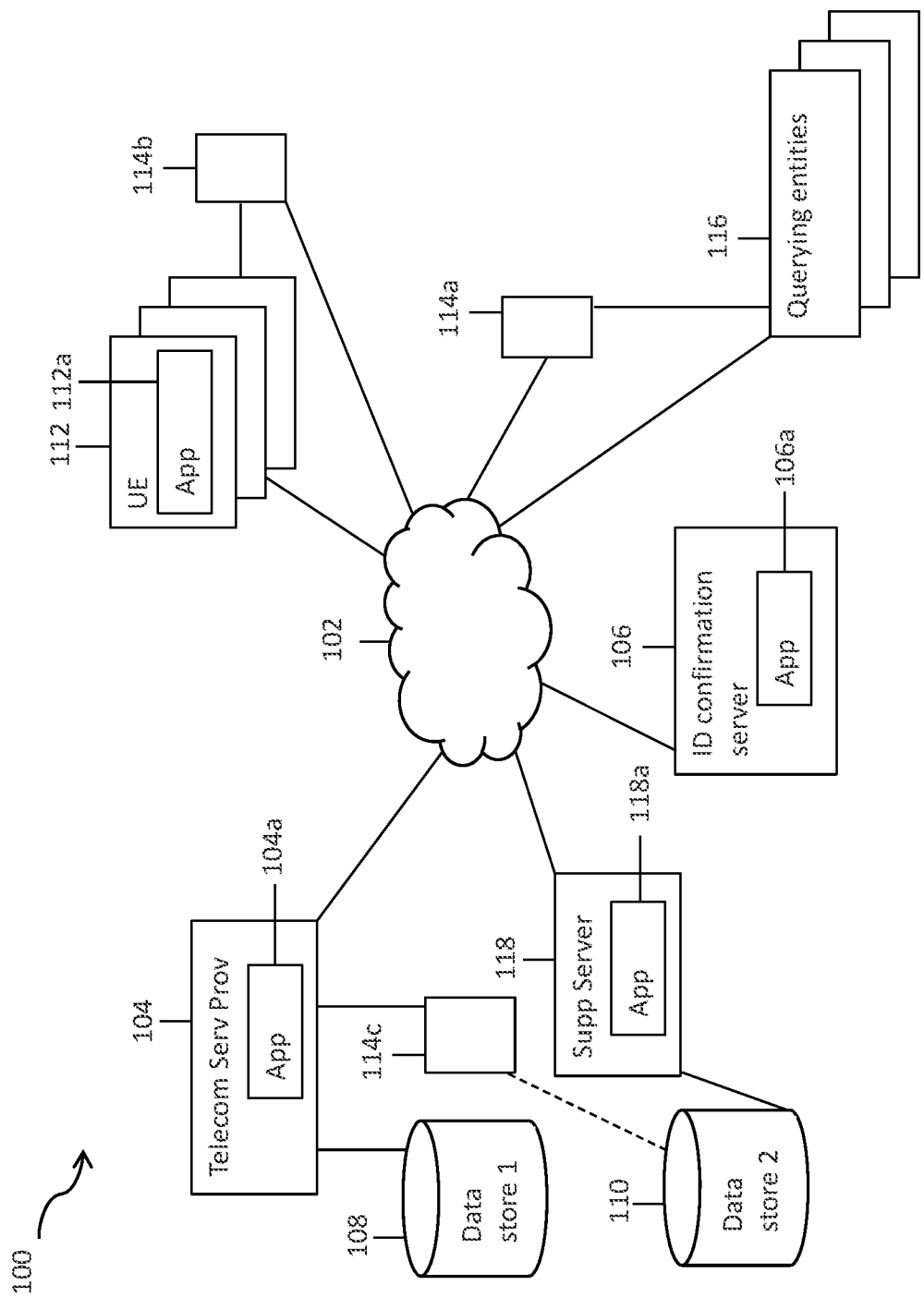
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunications service providers may receive numerous queries for identity verification from entities such as financial institutions, retailers, utility companies, and other parties that offer goods and services to customers. The terms "identity" and "account" may both be employed herein to describe a name or names that may be associated with a telephone number that may be linked to a landline or to a mobile device.

These queries may be sent by the entities based on (e.g., triggered by) a user's establishment of a new account, a change of information in a user account, or a request for purchase of goods or services. These entities, which may be referred to collectively as "vendors," may submit information provided by the customers to the telecommunications service provider in the form of a query to the telecommunications service provider in order to confirm the identity of the user. This information may comprise a telephone number and a name, in addition to a street address, email address, social media contacts, or other information. The telecommunications service provider may have a data store of account information associated with millions of customers, and may have to search the entire data store of all telephone numbers and accounts while attempting to respond to these queries to determine (1) if the telephone number submitted is in its data store and (2) if it is associated with the name and/or other information submitted. This is not only quite time-consuming and therefore expensive to both the telecommunications service provider and the querying party, but the process also may not produce the most robust result. This may be time consuming and not produce an accurate result, for example, because the telecommunications service provider has a database full of information for millions of accounts, some of which may be associated with one or more identities, multiple devices, users, and phone numbers, and the longer it takes the telecommunications service provider to process the query, the fewer queries the telecommunications service provider can respond to over time, thus lessening the revenue earned by the telecommunications service provider for providing this service to vendors, and increasing the wait time and possibly an associated delay in the requested purchase or account set-up that triggered the query from the vendor, thus negatively impacting the customer and vendor experiences.

Using the systems and methods discussed herein, a telecommunications provider can receive queries from vendors and first check the queries' information, for example, the telephone number submitted and the name submitted, against a first data store that comprises a plurality of confirmed identities. Queries and responses to queries discussed herein are sent by a plurality of vendors such as financial institutions, utility companies, educational institutions, and retailers. These queries comprise at least some of a name, an address, a gender, a mobile phone number, a landline phone number, a work number, an email, a social security number, social media identifiers (handles, URLs, etc.) and other identifying information. For example, the information that a customer submits to a bank when opening a new account may be different than the information sent to an online retailer when opening up a new store card. The queries sent to the telecommunications service provider may be sent in combination with a payment and may elicit responses comprising a confidence level in the identity confirmation that may comprise an integer or number from 0-10, where 10 is an unconditional confirmation and 0 may be an indication that the information submitted in the query is associated with previous fraud or which has been otherwise flagged. In some cases, a null value may be returned to the querying entity to indicate, for example, that the telephone number submitted in the query is not found in any data store of the telecommunications service provider. In an embodiment, when an identity is flagged, it may be associated with a lower confidence level and/or associated with a lower predetermined threshold that, if exceeded, may lead to revocation and/or a response to related queries that indicates the query's information may be fraudulent.

In some embodiments, a vendor may want to confirm an identity associated with a phone number to be used in telemarketing. In that example, the vendor may seek to confirm the identity in order to avoid fines that are associated, under federal law, with do-not-call rules. In one example, a party may contact a particular telephone number once, and then cannot contact that number again if the party requests to be placed on a do-not-call list. If the party is contacted again by the vendor, they may face a fine.

In some embodiments, the telecommunications service provider may first determine if the number submitted is associated with an identity for example, for a primary number, and if the identity can be confirmed using a confirmed identity data store that contains information which the telecommunications service provider is confident is accurate within a predetermined error. If the information is found in the confirmed identity data store, the telecommunications service provider may return a confirmation to the vendor who submitted the query in the form of a confidence level that indicates the identity is confirmed.

In an embodiment, if the information submitted in the query is not found in the confirmed identity data store, the telecommunications service provider may then determine if the information is in a second data store that may be referred to as the supplemental data store. The supplemental data store comprises partial information about identities and accounts, information may be stored in the supplemental data store and subsequently promoted to the first data store based on a plurality of factors. Conversely, in some embodiments, identities and/or accounts may be demoted from the confirmed identity data store to the supplemental data store, for example, if information that is not the same as that in the confirmed identity data store is received more than a predetermined number of times. It is appreciated that this incongruous information may be received in response to a change of name due to marriage or divorce for example, or in response to a customer's relocation and/or change of email address or social media contact information. Thus, a demotion to the supplemental data store is not necessarily an indication of fraud or any issues with the identity, but is rather a preventive measure taken by the telecommunications service provider for fraud and identity fraud protection.

Turning back to the factors associated with promotion of identities from the supplemental data store to the confirmed identity data store, these factors may include data collected from sensors in communication with a plurality of user equipment (UE) and the querying entities via a plurality of sensors, a length of time that the account has been opened, a payment history associated with the account, previous changes to the account, an analysis of stored queries in the second data store received by the telecommunications service provider that comprise the same or similar information, and/or a third-party verification that the telecommunications service provider pays to obtain. In an embodiment, the sensors may also be in communication with and distributed at different points and milestones in the customer care system and/or in the caller address management (CAM) system. The sensors, and the data passively and actively collected by the sensors, may be used to flag, revoke, promote, or otherwise adjust a storage location and/or confidence level associated with an identity. Sensors coupled to the user equipment may be employed to retrieve data to use to confirm identities and/or promote identities to a confirmed identity database. These sensors may be associated with geolocation, device use, app downloads and updates, in-app purchases, and other activities performed on the device with or without user interaction or initiation.

In an embodiment, if the telephone number is not found in the confirmed identity data store, the application may analyze the second data store to determine if the number is stored in this, the second, supplemental data store. If the number is present, a determination may be made based on predetermined thresholds (1) if there is enough information associated with that number in the second data store to (a) infer a relationship between the name and number (e.g., is the information exactly the same, overlapping, or is there a familial relationship between identities and phone numbers, including other spellings/middle initial use of the same name with the same or multiple numbers on an account) and, in response to the inference, promote the number/name to the confirmed identity data store and return a confirmation with a high confidence level. In another example, if the application determines that there is enough information in the second data store to infer a relationship between the information submitted in the query and the information in the second data store, a response with a high confidence level may be returned to the vendor and the number may be promoted to the confirmed identity data store. In alternate embodiments, the determination may further include whether to (b) report fraud in the response to the vendor and return a response with a 0 confidence level to indicate fraud, or (c) pay for a third party confirmation of the identity.

In an embodiment, the application may also (2) determine if there is not any information in the second data store and return a null value indicating as such to the vendor; or (3) determine if there is not enough information associated with that number in the second data store to return, infer, or pursue a confirmation, the application may store the query from the vendor in the second data store and return a response to the vendor that indicates a low confidence level, lower than that returned if the identity is confirmed using the information in the supplemental data store. In some embodiments, the application may (4) create an entry for the submitted information if the application determines that there is no information in the second data store and store the entry in the second data store.

In yet another example, if the application determines that there is enough information in the second data store to pay a third party for a confirmation and that confirmation is successful, a response with a high confidence level may be returned to the vendor and the number may be promoted to the confirmed identity data store. In some embodiments, an identity (which may be associated with one or more telephone numbers) may be promoted to the confirmed identity data store based on a plurality of factors including a number of queries received with the same or similar information, a length of time the identity and/or numbers associated with the identity have been established with the telecommunications service provider, as well as a history of bill payment (and/or lateness and non-payment).

As the telecommunications service providers earn revenue off of the queries submitted, and the querying parties have a vested interest in being able to confirm new accounts and/or purchases in order to on-board new customers and/or process orders, this time-consuming and somewhat imprecise process costs everyone involved time and money, including the customer who's purchase or account opening triggered the initial query since their service and/or purchase may be delayed.

Thus, using the systems and methods disclosed herein, querying parties receive accurate information regarding customers, the telecommunications service provider is able to process more queries in the same amount of time, thus generating more revenue and producing a better, more accurate result for the querying party in response to the query submitted. Therefore, the systems and methods discussed herein enable more rapid and accurate processing of identity verification queries from vendors by a telecommunications service provider, which enables the telecommunications service provider to earn additional revenue, provide more accurate responses including confidence levels to the vendors, and provide a more seamless experience and added value to their subscribers by enabling the subscribers to more readily set up accounts and purchase goods and services from the vendors. In addition, the architecture of the system discussed herein, including the sensors, separate data stores, and communication among and between the sensors and the telecommunications service provider's data stores, helps improve the efficiency and accuracy of responses to queries. This improved efficiency and multi-sourced data monitoring and retrieval enables the provider to meet the increasing volume of requests and capture and enhance the data quality and accuracy for use in responding to requests.

FIG. 1 illustrates a system 100 capable of executing according to embodiments of the present disclosure. The system 100 comprises a server 104 that may be referred to as a "telecommunications service provider server" 104 since it may be associated with a telecommunications service provider. At least one application 104a may be stored on the telecommunications service provider server 104 and may be executable by a processor (not shown) to perform various functions, including accessing and analyzing a plurality of data stores including data stores 108 and 110 and receiving information from pluralities of sensors 114a and 114b, discussed below. The telecommunications service provider server 104 may be configured to communicate with other, remote entities via a network 102. A plurality of sensors 114c may be in communication with the server 104, this server 104 may be associated with a customer care system and/or a caller address management (CAM) system, and the plurality of sensors 114c may be configured to capture information submitted to these systems and transmit the information to the supplemental data store 110. These remote entities may include a plurality of UE 112 that are associated with the telecommunications service provider, an ID confirmation server 106 affiliated with a third party. In some embodiments, a separate application 106a may be stored in a non-transitory memory of the ID confirmation server 106, this application 106a may communicate directly with any or all of the applications of the system 100, including 118a and 104a.

The system 100 may further comprise a plurality of servers 116 that may each be associated with various querying entities including retailers, financial institutions, utility companies, and other vendors. In an embodiment, a plurality of sensors 114b in the form of hardware, software, or combinations thereof may be deployed, for example, as APIs associated with some or all of an address book, mapping, lifestyle, or retail application stored on the plurality of UE 112. In some embodiments, the plurality of sensors 114a capture information submitted in the queries from the plurality of entities 116, and transmit the captured information to the telecommunications service provider server 104. The transmitted information may be stored in the second data store 110 that may be referred to as the supplemental data store 110. The supplemental data store 110 may be stored on and in communication with a supplemental server 118. The supplemental server 118 may be associated with the same telecommunications service provider as the server 104, and may comprise an application 118a that may be independent of the application 104a. In contrast to the information stored in the confirmed identity data store 108, the supplemental data store, 110, contains identities and that the telecommunications service provider has not been able to confirm. These sensors may be stored in a plurality of locations including the CAM system, customer care system, through-out a plurality of applications 112a (contacts, maps, etc.) on the plurality of UE 112, as well as in the supplemental data store 110.

The identities in the supplemental data store 110 have not been confirmed, e.g., associated with a confidence level high enough (and/or for long enough) to promote the identities to the confirmed identity data store, or because there is not enough evidence in the confirmed identity data store 108, or because the information is contrary to information in the confirmed identity data store 108. In an embodiment, the sensors 114b and 114a are in communication with the plurality of UE 112 and the plurality of querying entities 116, respectively, via the network 102 or via a direct connection, and are also in communication with the telecommunications service provider's server 104 via the network 102.

The information in the supplemental data store 110 may be populated by the plurality of queries received, by new identity information, and by information received from the pluralities of sensors 114a and 114b. These sensors 114a and 114b may be in the form of hardware, software, or combinations of both, and may in some cases act as application programming interfaces (APIs) in between the querying entities 116 and plurality of UE 112 associated with the telecommunications service provider. The sensors 114a associated with the querying entities 116 may store not only the information submitted by the entity but what entity (name and type, e.g., financial institution, retailer, utility company, etc.) is requesting the information. This information may be used for confirmations/promotions to the confirmed identity data store. The plurality of sensors 114b associated with the plurality of UE 112 may be configured to capture information in address book applications, mapping applications, payment information (e.g., where is the person shopping and what are they buying?), web browser history, geographic location(s), and other information that may be used to help confirm user identities, in particular on non-primary numbers associated with the identities. The plurality of sensors 114a-114c may be implemented as hardware and/or software, and may be configured to record and transmit various information received from a plurality of distinct sources including the plurality of UE 112, the customer care system, the CAM system, and the plurality of querying entities 116.

For example, if an identity is assigned to a number associated with an account that has not previously had an identity associated with it, or if a name is changed in an address book, this information may be captured by the sensors 114b from the plurality of UEs 112 at periodic intervals. Additional triggers that may cause the plurality of sensors 114b to record, flag, and transmit information include the addition of new numbers to an identity, the activation of additional devices, and the downloading of applications (e.g., mapping, shopping, and lifestyle applications).

In an embodiment, the querying entities 116 may send a plurality of queries to the telecommunications service provider server 104 that may be received by the application 104a and/or the supplemental server's application 118a via the network 102. These queries may contain information regarding new customer identities (e.g., customers whose names have not been submitted before) and/or accounts established with the entities, and/or changes associated with identities associated with numbers submitted to the vendors. The queries may also comprise a payment or a link to a method of payment such that the telecommunications service provider may be paid by the querying entity either when the query is sent to the provider or when the response is sent back to the querying entity. In some embodiments, a separate payment step may be performed by the querying entity 116 to the telecommunications service provider server 104 subsequent to the entity's receipt of the response from the provider.

In an embodiment, the information in the query may comprise a name, a telephone number associated with the telecommunications service provider, an address, a gender, an age, an email address, a plurality of social media contact information such as handles and uniform resource locators (URLs), and the querying entities seek confirmation that the information in the queries, which was likely submitted by a customer to the entity when establishing a new account or making a purchase, is correct and can be confirmed (verified) by the telecommunications service provider as corresponding to information that is stored by the telecommunications service provider. The information provided in the query may also comprise an entity identification as well as an entity type (financial institute, retailer, utility, etc.).

While the telecommunications service provider associated with the telecommunications service provider server 104 may have a master data store of all identities, that data store may be time-consuming and expensive to search. As such, in an embodiment where the application 118a receives the query, compares the submitted information to the first data store 108 that may be referred to as the "confirmed identity data store" 108. This data store may comprise information that the telecommunications service provider has a predetermined confidence level, e.g., above 8 on a scale of 0-10 where 10 is complete confidence. This information may contain, for example, information about a single phone number associated with a first identity, and may contain multiple phone numbers associated with the identity where each number of the account is associated with at least one identity. If the information submitted in the query can be verified by the application 118a using the confirmed identity data store 108, the application 118a may return a notification including a numeric indication of the confidence level in a confirmation of the submitted identity. This verification, which may also be referred to as an authentication, may comprise comparing the query information to a plurality of data stores, depending upon whether or not the telephone number is found in the data store.

In an embodiment, if the information cannot be confirmed by the application 118a based on an analysis of the query against the confirmed identity data store 108, the application 118a may determine if the information is in the second data store 110. Subsequent to the application 118a analyzing the information submitted in the query in light of the supplemental data store 110, the application 118a may send a notification to the querying entity 116 with a confidence level that may be based on (1) whether the application 118a finds the phone number in the query in the supplemental data store 110, (2) whether the application 118a finds the name in the query in the supplemental data store 110 associated with the number of (1), (3) a number of indications in the supplemental data store 110 as to how many times information that is the same as or overlaps with the information in the query has been submitted for confirmation, (4) whether any of the query's information is contained in the supplemental data store 110, and (5) whether any of the query's information is contrary to information contained in the supplemental data store 110.

Figure 2:
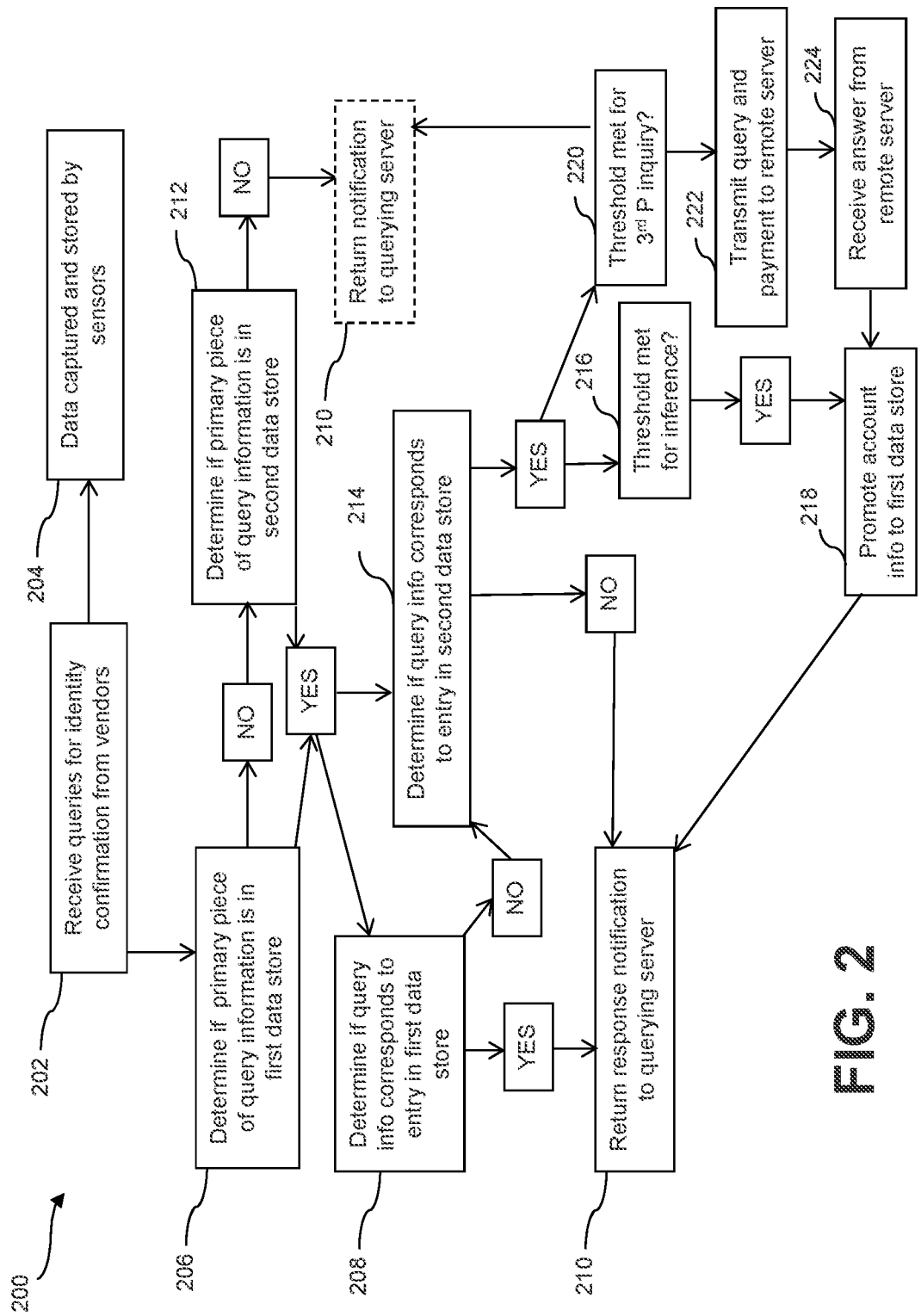
FIG. 2 is a flow chart of a method according to certain embodiments of the disclosure.

FIG. 2 is an illustration of a method 200 according to embodiments of the present disclosure. In the method 200, at block 202, an application stored in a non-transitory memory of a server associated with a telecommunications service provider receives a plurality of queries from a plurality of querying entities including retailers, financial institutions, and utility companies. At block 204, an API that may be associated with the telecommunications service provider captures the queries, including the information and the identity and type of the querying entity, and transmits the information to the telecommunications service provider to store in the supplemental data store. At block 206, the application determines if a primary piece of information submitted in each query of the plurality of queries received at block 202 is stored in a first, confirmed identity data store. In an embodiment, this primary piece of information comprises a telephone number that may be associated with a mobile device including phones and tablets or a land line. At block 208, if the application determines at block 206 that the primary piece of query information is in the confirmed identity data store, the application determines if the query information corresponds to the information associated with the telephone number in the confirmed identity data store. If the information corresponds to the information in the confirmed identity data store, at block 210, the application returns a response to the querying entity with a confirmation indication that may be in the form of a high confidence level.

In an embodiment, if the application determines at block 206 that the primary piece of information is not in the confirmed identity data store, it may then determine at block 212 if the primary piece of information is in the second, supplemental data store. If the information (e.g., the telephone number) is not in the supplemental data store, or if conflicting information is in the supplemental data store for the telephone number, a notification response may be returned to the vendor at block 210 that indicates either fraud (0), low confidence (a number between, for example, 1-5 depending on the degree of difference between the information in the data store, e.g., a difference of a middle initial or potential nickname and a difference of a state and/or email address), or an absence of the number (null). It is appreciated that block 210 is indicated twice in FIG. 2 for ease of illustration of the embodiments.

In an embodiment, if the primary piece of query information is found in the supplemental data store at block 214, the method may proceed to block 216 where a determination is made by the application as to whether or not there is enough information associated with the primary piece of query information to form an inference as to whether the identity can be confirmed. This threshold may comprise a predetermined number of queries received across a plurality of vendors and vendor types and information received from sensors that populate the supplemental data store to comprise a plurality of same or similar names and/or other identifying information associated with the telephone number in the data store that indicate variations of the same spelling, middle names and initials, or potential familial relationships. If the application determines that this threshold is met, at block 218, the application promotes the phone number and associated confirmed information to the data store, and may return a notification at block 210 to the querying entity that includes a confidence level that may be lower than that returned when the phone number is found in the confirmed identity data store but that still indicates that the identity has been confirmed.

In an alternate embodiment, if the primary piece of query information is found in the supplemental data store at block 214, the method may proceed to block 220 where the application determines if a predetermined threshold has been met such that the telecommunications service provider may transmit a query for identity confirmation to a third party (e.g., to a remote server). This predetermined threshold may comprise a predetermined number of queries received across a plurality of vendors and vendor types and/or related queries (e.g. those that have overlapping and common identity information), and/or other information received from sensors. The information from the plurality of sensors may be used to populate the supplemental data store, this information may comprise a plurality of same or similar names (identities) associated with the telephone number in the data store that indicate variations of the same spelling, middle names and initials, or potential familial relationships. At block 222, if it is determined at block 220 that the predetermined threshold has been met, both the query and a payment for the response are transmitted from the telecommunications service provider to the third party. In an embodiment, at block 224, an answer may be received by the telecommunications service provider from the remote server. If this answer confirms the identity queried, the phone number (account) may be promoted to the confirmed identity data store at block 218 and a response may be returned to the querying server at block 210. The response returned at block 210 may comprise a higher level of confidence than that sent at block 210 based on a confirmation at block 216, but may comprise a lower level of confidence than the response sent at block 210 based on a confirmation of the entry in the confirmed identity data store at block 208.

In an embodiment (not shown), if the third party server is not able to confirm the identity based on the query information transmitted at block 222, the application transmits a notification indicating as such to the telecommunications service provider at block 224. In an embodiment, the application returns a notification to the querying entity that comprises a low confidence level or with a fraud indication, depending upon the information received in the notification at block 224.

In an alternate embodiment, if it is determined that the thresholds at either of blocks 216 or 220 are not met, the application may return a response to the querying entity with a low confidence level, e.g., a higher confidence level than a 0 fraud indication or a null indication, but low enough for the receiving querying entity to interpret as being a response of low confidence with respect to the confirmation of the identity. In that case, the querying entity may request additional consideration from the customer or may reject the order or account set up.

In one example, if the application receives a query from a vendor for an identity confirmation for person K, associated with a particular phone number, the application may first determine if that information is stored in the confirmed identity data store. If the information is not found, the application may analyze the second data store and determine that an identity of person K has 4 phone numbers associated with it, the first number may be associated with person K, the second with person L, and the last two may not be associated with any specific names in the second data store. In this example, if the first number that is associated with person K matches the number submitted by the vendor, the application may return a confirmation to the vendor, indicated by a numerical confidence level. In another example, a query submitted by vendor L for person M who claims an association with one of the phone numbers associated with person K's identity, and the application determines that the number is not associated with person K nor with any name in any of the telecommunications service provider's data stores. This determination by the application result in the vendor getting an "unconfirmed" response from the telecommunications service provider or another response with a lower confidence level as compared to a "confirmed" response that would be associated with a higher confidence level. In an embodiment, if an identity is not found by the application in the supplemental data store, the application may create an entry for the identity in the supplemental data store and begin storing information received in queries related to the identity and/or to pieces of information (phone number, etc.) received for information in the initially received query.

In one example, if an application determines that the second data store comprises a predetermined level of information for a particular number that indicates the number is likely to be valid when associated with a submitted name, the telecommunications service provider may pay a third party verification source to confirm the identity of the number using additional information such as a social security number. In another example, if 5-30 queries are received for names including Joe Smith, Joseph Smith, Joseph K. Smith, and Joe K. Smith that are all associated with the same phone number, and no negative feedback (e.g., fraud) has been reported associated with that phone number within a predetermined period of time, the telecommunications service provider may determine that the number is verified, confirm as such with a notification to the vendor, and may promote the identity information to the confirmed identity data store. Promoting the identity information may comprise moving the identity information from the supplemental data store to the confirmed identity data store. In other embodiments, the identity information may not be promoted to the confirmed identity data store but rather may have a higher confidence level linked to the identity and stored in the supplemental data store. If the application determines, based on a periodic analysis, that an identity has been at or above a predetermined confidence level threshold for a predetermined period of time, the identity may be promoted to the confirmed identity data store.

In one example, if a vendor submits a query to the telecommunications provider to confirm an identity for person K who claims to be associated with a particular phone number, the telecommunications service provider may receive the query and first determine whether or not that information is a primary number associated with an identity and then determine if the identity is associated with primary or non-primary account numbers in the confirmed identity data store. If the number associated with the identity is found as either a primary or a non-primary number in an account in the confirmed identity database, the application may return a confirmation to the vendor with a high confidence level. This confidence level may be stored in the confirmed identity database and linked to the identity.

In an embodiment, if the number is found with a different name in the data store that the application determines is substantially different from the actual entry in the confirmed identity data store, the telecommunications service provider may return a response to the query to the vendor that indicates potential fraud, such as a 0 value. By "substantially different," it is meant that a query received for Rob or Bob or Robbie at a number associated with Robert, and the same last name, in the confirmed identity data store may not return a confirmed response with the highest confidence level, but may not return a response that indicates fraud and rather may include a lower confidence level, whereas a query received for Xavier Wanderlust at a number associated with Robert Smith may be more likely to trigger a response to the vendor indicating potential fraud.

Figure 3:
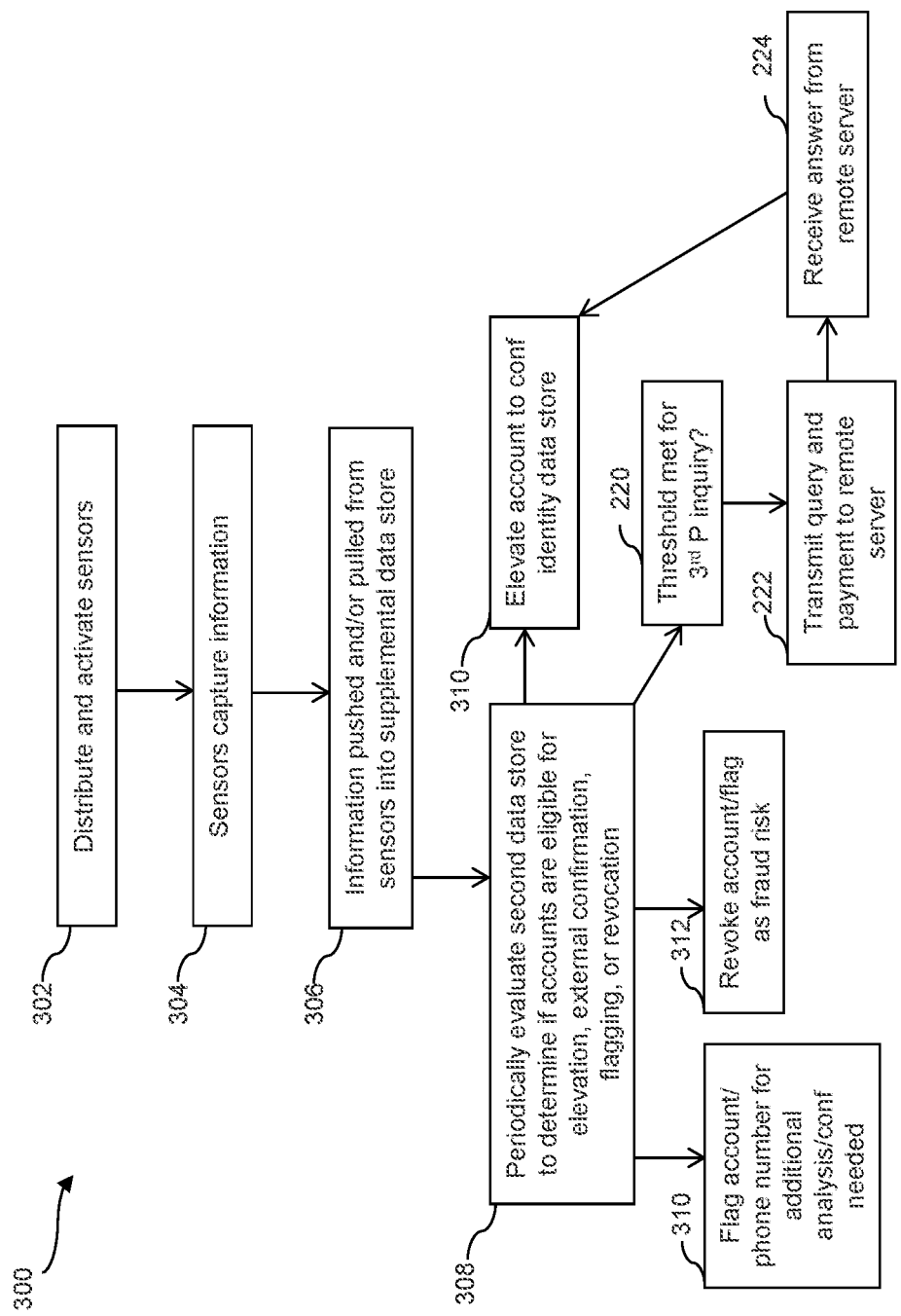
FIG. 3 is a flow chart of a method according to certain embodiments of the disclosure.

FIG. 3 is a method 300 of evaluating and promoting identities from the supplemental data store to the confirmed identity data store based on information received from a plurality of sensors. In an embodiment of the method 300, at block 302, a plurality of sensors are distributed as hardware, software, or combinations thereof to (1) capture queries received at block 202 in the method 200 of FIG. 2, and (2) to capture additions, revisions, deletions, and other activities on UE applications including address books, retail applications, mapping applications, wallet applications, web browsers, and other applications that may indicate an identity including a gender, age range, parental status, address (e.g., from shipping and billing addresses), social media contacts, email addresses, and other information that may be captured at block 304 and transmitted by either a push or pull function to the telecommunications service provider at block 306.

In an embodiment, at block 308, a plurality of triggers may cause the evaluation of the supplemental data store. This plurality of triggers at block 308 is distinguished from the queries received at block 202 in the method 200 in FIG. 2 because the triggers may be based on (1) a predetermined schedule based on the passage of time (e.g., days, weeks, hours, etc.,) (2) a number and type of queries and other information received for various identities/telephone numbers, as opposed to the trigger of the analysis in FIG. 2 which is the receipt of queries for identity confirmation. That is, the method 300 in FIG. 3 is performed in order to at least (1) add identities to the supplemental data store, (2) promote identities from the supplemental data store to the confirmed identity data store, (3) determine if there is justification for a third party identity confirmation in the absence of a particular query, (4) determine if identities are to be flagged or revoked.

The sensors may collect information such as names associated with numbers in an address book, such that if James Jones is the identity associated with a primary phone number on an account, and the address book of James Jones has Mary Jones as the identity associated with a second number on the account and James Jones Junior as the identity associated with a third number on the account, and the account is stored in the supplemental registry, the supplemental data store may be populated from this identity information and the account may be promoted to the confirmed identity data store if and when any of the thresholds discussed herein are met. Conversely, if all of the above is true but a query for Zander Styles is received for a number previously associated with James Jones, this may serve as a basis upon which the identity and/or account is flagged for potential fraud.

In an embodiment, if it is determined at block 308 that a predetermined threshold has been met for an identity based on a periodic, time-based, trigger or a threshold being met that triggers the analysis (e.g., a predetermined number of queries being received over a period of time for the phone number), the identity may be promoted to the confirmed identity data store at block 310. This means that next time a querying party submits information for the telephone number with a name that corresponds to the name in the confirmed identity data store, a response such as those discussed in FIG. 2 at block 210 may be returned to confirm the identity to the querying entity that contains a higher confidence level than that returned for an identity that is inferred as confirmed.

In an embodiment, and as discussed in FIG. 2, if it is determined at block 308 that a predetermined threshold has been met to trigger the telecommunications service provider to request identity confirmation from a third party, the method proceeds to blocks 220-224 similarly to what is discussed in FIG. 2. The confidence levels discussed herein may be stored in the supplemental and/or confirmed identity data stores and linked to the primary number of an account as well as to subsequent numbers, and in some examples, an identity may have different confidence levels associated with different telephone numbers of the same account. In alternate embodiments, if the sensors collect information that is new to the supplemental data store or contrary to information stored in either the supplemental data store or the confirmed identity data store, the identities may be flagged at block 310 and associated accounts may ultimately be revoked at block 312. In an embodiment, whether or not an identity and/or associated account is flagged and/or revoked may be partially determined by the type of entities submitting the queries. For example, multiple queries received from credit card issuing institutions over a short period of time may trigger a flagging or revocation, whereas multiple queries received for different types of querying entities such as utilities, banks, and retailers may not trigger the system or may trigger a lower-level flag that may indicate an identity (person/family) has relocated.

Figure 4:
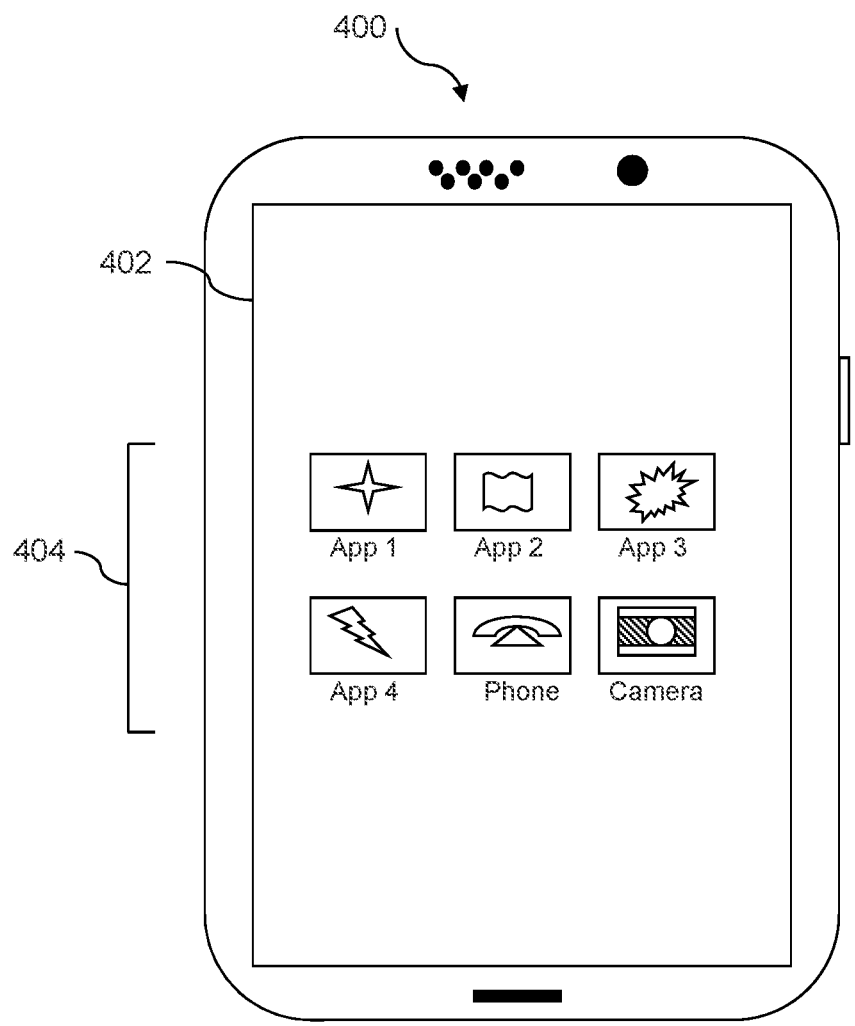
FIG. 4 is an illustration of user equipment (UE) according to certain embodiments of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
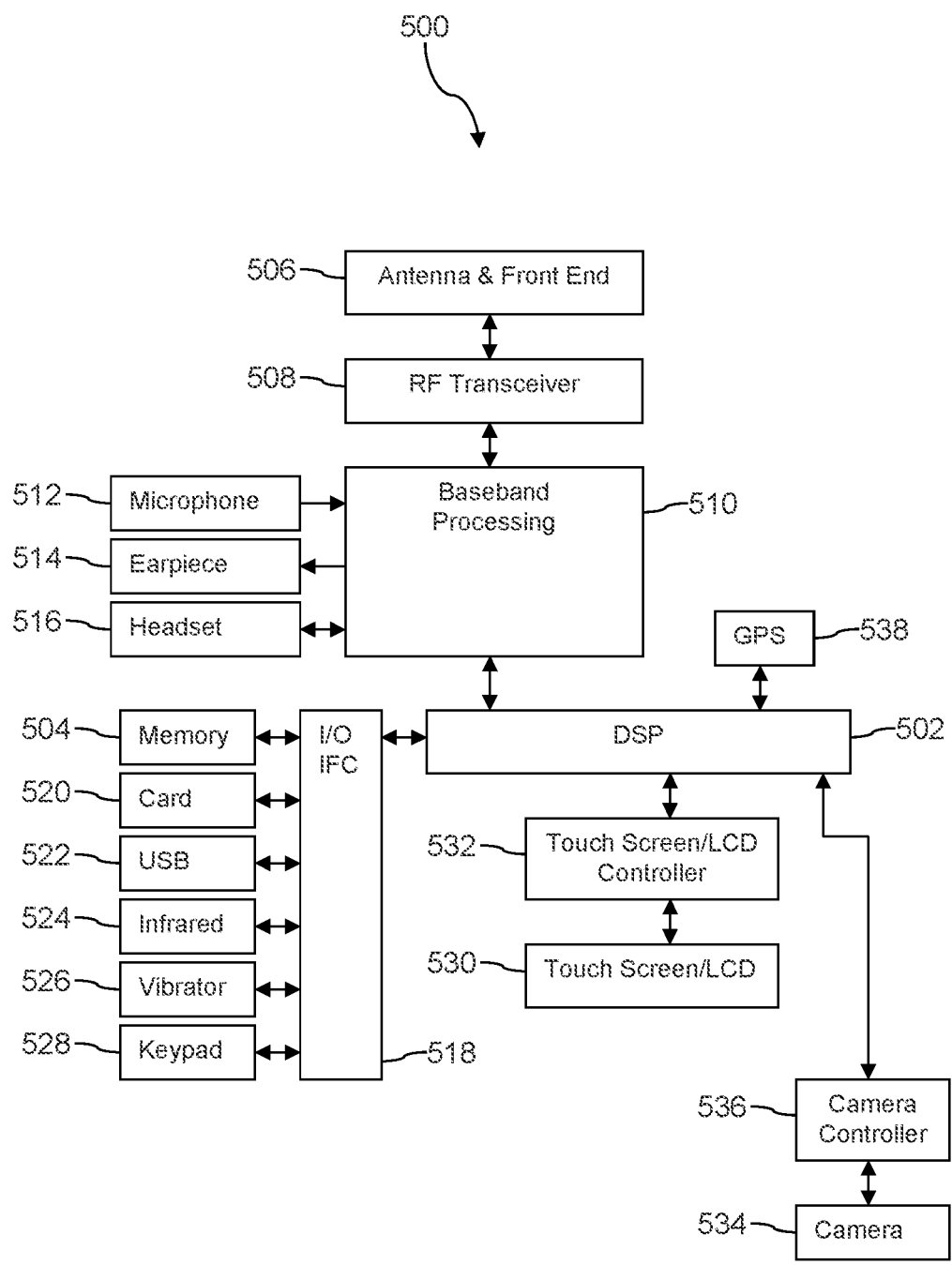
FIG. 5 is a block diagram of a configuration of hardware architecture of a handset according to certain embodiments of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identifier (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
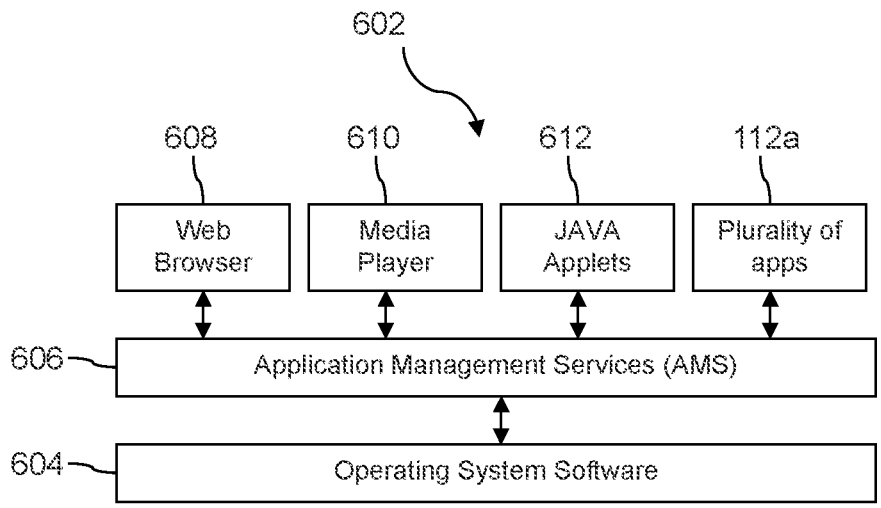
FIG. 6A is a block diagram of a software architecture of a handset according to certain embodiments of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, a plurality of applications represented by 112a, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
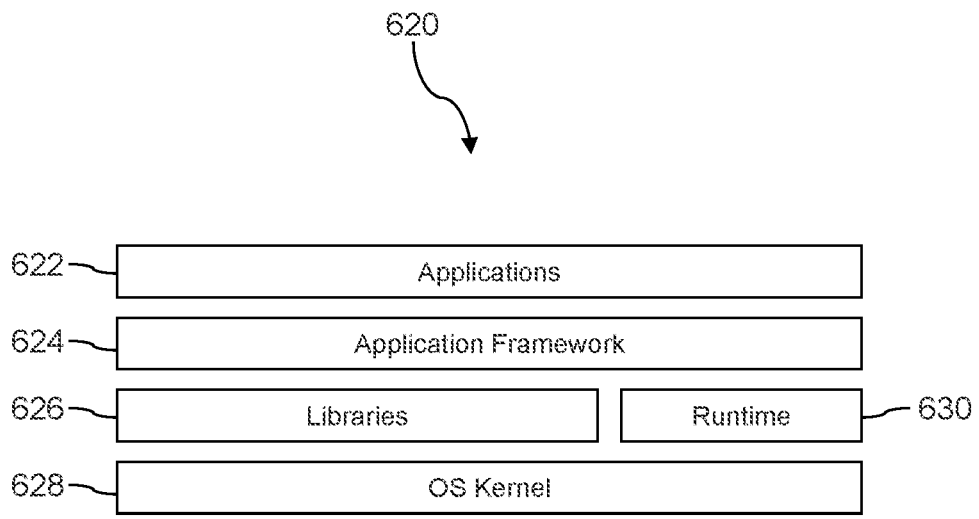
FIG. 6B is a block diagram of another software architecture of a handset according to certain embodiments of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
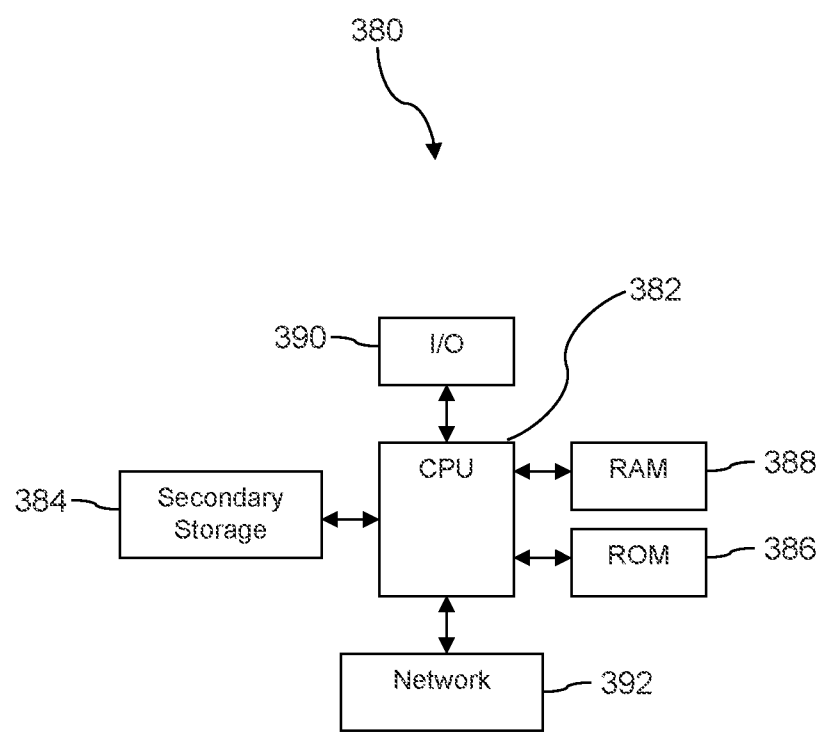
FIG. 7 is a block diagram of a computer system according to certain embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for verifying identities, comprising:
 a plurality of user equipment (UE) associated with a plurality of identities;
 a first plurality of sensors in communication with each UE of the plurality of UE;
 a server associated with a telecommunications service provider;
 a second plurality of sensors configured to capture a query transmitted to the telecommunications service provider server from a plurality of querying servers, wherein each querying server of the plurality of querying servers is associated with a third party; and
 an application stored in a non-transitory memory of the telecommunications service provider server and executable by a processor to:
  receive a plurality of information from the first and the second pluralities of sensors,
  store the received plurality of information in a supplemental data store,
  perform, in response to at least one of a time-based trigger or a trigger associated with a predetermined number of queries received for an identity of the plurality of identities, an analysis to determine if one or more thresholds are met,
  transmit, based on a determination that a first threshold associated with a number of queries associated with the identity is met for the identity, a request to a remote server for identity confirmation of the identity,
  receive a response from the remote server, and
  based on at least one of the response received from the remote server or the analysis performed, promote the identity from the supplemental data store to a confirmed identity data store, wherein the confirmed identity data store is searched first in response to receipt of a query for identify confirmation from a third party to determine if information submitted in the query is associated with a confirmed identity and the supplemental data store is subsequently searched in response to receipt of the query if the information submitted in the query is not found in the confirmed identity data store, and wherein the confirmed identity data store comprises a plurality of confirmed identities that are each associated with a confidence level that exceeds a confidence level threshold and the supplemental data store comprises a plurality of non-confirmed identities that are each associated with a confidence level that does not exceed the confidence level threshold.

2. The system of claim 1, wherein the request transmitted to the remote server includes a payment to the remote server.

3. The system of claim 1, wherein the application is further configured to, subsequent to promoting the identity to the confirmed identity data store, assign or adjust a confidence level associated with the identity and store the confidence level in the confirmed identity data store.

4. A system for evaluating and responding to identity queries, comprising:
 a plurality of user equipment (UE) associated with a telecommunications service provider; and
 a server associated with the telecommunications service provider and in communication with the plurality of querying servers via a network, the server comprising an application stored in a non-transitory memory and executable by a processor to:

receive a plurality of queries for identity confirmation from a plurality of querying servers, wherein each querying server of the plurality of querying servers is associated with a third party, initially search a confirmed identity data store to determine if a first piece of information contained in a query of the plurality of queries received is associated with a confirmed identity in the confirmed identity data store, wherein the confirmed identity data store comprises a plurality of confirmed identities that are each associated with a confidence level that exceeds a confidence level threshold, return, to the querying server, a confirmation notification comprising a confidence level associated with identity confirmation based on a determination that the first piece of information is in the confirmed identity data store, subsequently search a supplemental data store to determine if the first piece of query information is in the supplemental data store in response to a determination that the first piece of information is not located in the confirmed identity data store, wherein the supplemental data store comprises a plurality of non-confirmed identities that are each associated with a confidence level that does not exceed the confidence level threshold, return, in response to a determination that the first piece of information is not in the supplemental data store, a data missing notification to the querying server comprising an indication that the first piece of information was not found in the first or the supplemental data stores and the identity is not confirmed, return, in response to a determination that the first piece of information is in the supplemental data store and consistent with information in the supplemental data store, a supplemental data store notification to the querying server, promote, in response to a determination that the information in the supplemental data store associated with the first piece of information meets or exceeds a predetermined threshold of queries comprising related information received over a time period, an identity associated with the first piece of information from the supplemental data store to the confirmed identity data store and return a promotion notification to the querying server, and store the query in the supplemental data store.

5. The system of claim 4, wherein a confidence level is associated with each of the confirmation notification, data missing notification, supplemental data store notification, and promotion notification to indicate a confidence with which the telecommunications service provider is able to confirm an identity associated with the query, wherein a confidence level associated with the confirmation notification is a highest confidence level, wherein a confidence level of the promotion notification is less than that of the first indication but greater than a confidence level associated with the supplemental data store notification and a confidence level associated with the promotion notification, and wherein the confidence level associated with the third indication is greater than the confidence level associated with the second indication.

6. The system of claim 5, wherein each confidence level associated with each of the confirmation notification, data missing notification, supplemental data store notification, and promotion notification is a different value which does not overlap with any other confidence level.

7. The system of claim 4, wherein the first piece of information is a telephone number associated with a mobile device or a land line, and wherein the application is configured to determine if the telephone number is a primary number associated with an identity.

8. The system of claim 4, wherein the at least one vendor is a financial institution, utility company, or another provider of goods or services.

9. The system of claim 4, further comprising a server remote from the telecommunications service provider server, wherein the application is configured to send a query to the remote server to request confirmation of the first piece of information based upon a determination that a predetermined threshold has been met or exceeded.

10. The system of claim 9, wherein the remote server responds to the query in response to a determination that a fee associated with the query has been received.

11. The system of claim 4, wherein the confirmed identity data store comprises a plurality of verified identity information for identities associated with the telecommunications service provider, wherein the information comprises names, phone numbers, addresses, a duration of the identity, a payment history associated with the identity, an email address, or a social media contact.

12. The system of claim 4, wherein the supplemental data store comprises a plurality of unverified identity information associated with new accounts with the telecommunications service provider, the information received in the plurality of the queries, and a plurality of information received from a plurality of sensors.

13. The system of claim 4, wherein the application is further configured to receive, subsequent to returning at least one of the confirmation notification, data missing notification, supplemental data store notification, and promotion notification, a payment from the querying server.

14. The system of claim 4, wherein the data missing notification comprises a null value.

15. A method of confirming identities for third parties, comprising:

receiving, by an application stored in a non-transitory memory of a telecommunication service provider's server and executable by a processor, a plurality of queries for identity confirmation from a querying server of the plurality of querying servers;

initially searching, by the application, a confirmed identity store to determine if a first piece of information contained in a query of the plurality of queries is associated with a confirmed identity in the confirmed identity data store, wherein the confirmed identity data store comprises a plurality of confirmed identities that are each associated with a confidence level that exceeds a confidence level threshold;

returning, by the application, to the querying server, a confirmation notification comprising a confidence level associated with identity confirmation in response to a determination that the first piece of information is in the confirmed identity data store, wherein the confirmed identity data store comprises a plurality of confirmed identities;

subsequently searching, by the application, a supplemental data store to determine if the first piece of information is in the supplemental data store in response to a determination that the first piece of information is not located in the confirmed identity data store, wherein the supplemental data store comprises a plurality of non-confirmed identities that are each associated with a confidence level that does not exceed the confidence level threshold;

returning, in response to a determination that the first piece of information is in the supplemental data store and consistent with information in the supplemental data store, a supplemental data store notification to the querying server; and promoting, in response to a determination that the information in the supplemental data store associated with the first piece of information meets or exceeds a predetermined threshold of queries comprising related information received over a time period, an identity associated with the first piece of information from the supplemental data store to the confirmed identity data store and return a promotion notification to the querying server.

16. The method of claim 15, wherein the confirmed identity data store comprises a plurality of verified identity information, wherein the plurality of verified identity information comprises names, phone numbers, addresses, a duration of an account with a telecommunications service provider for a mobile number or a landline, a payment history associated with the account, an email address, or a social media contact.

17. The method of claim 15, wherein the supplemental data store comprises a plurality of unverified identity information associated with new subscriber accounts with the telecommunications service provider, the information received in the plurality of the queries, and a plurality of information received from a plurality of sensors.

18. The method of claim 15, further comprising storing, by the application, in the supplemental data store, the plurality of queries received.

19. The method of claim 15, further comprising receiving, by the application, with the query, a payment from a vendor associated with the querying server.

20. The method of claim 15, further comprising determining, by the application, if the first piece of information comprises a primary phone number associated with the identity.

* * * * *